United States Patent [19]
Kawakami

[11] Patent Number: 5,246,352
[45] Date of Patent: Sep. 21, 1993

[54] CENTRIFUGAL SUPERCHARGER HAVING SUPPORT BEARING ASSEMBLY WITH OUTER DAMPED BEARING AND INNER FLOATING BEARING

[75] Inventor: Toshiro Kawakami, Obu, Japan

[73] Assignee: Aisin Seiki Kabushiki Kaisha, Kariya, Japan

[21] Appl. No.: 942,451

[22] Filed: Sep. 9, 1992

[30] Foreign Application Priority Data

Sep. 9, 1991 [JP] Japan ............................ 3-229056
Sep. 18, 1991 [JP] Japan ............................ 3-238221

[51] Int. Cl.$^5$ ........................ F04B 39/12; F16C 27/00
[52] U.S. Cl. ............................ 417/407; 384/99; 384/901
[58] Field of Search ............... 417/407; 384/99, 901

[56] References Cited

U.S. PATENT DOCUMENTS

| | | | |
|---|---|---|---|
| 2,702,093 | 2/1955 | Sherrill | 417/407 |
| 4,358,253 | 11/1982 | Okano et al. | 417/407 |
| 4,371,219 | 2/1983 | Yamane | 384/901 |
| 4,605,316 | 8/1986 | Utecht | 384/99 |
| 4,789,253 | 12/1988 | Perego | 384/99 |
| 5,056,935 | 10/1991 | Singh | 384/99 |

FOREIGN PATENT DOCUMENTS 56-138423 10/1981 Japan .
119926 7/1983 Japan ............................ 417/407

Primary Examiner—Richard A. Bertsch
Assistant Examiner—Roland McAndrews
Attorney, Agent, or Firm—Oblon, Spivak, McClelland, Maier & Neustadt

[57] ABSTRACT

A centrifugal supercharger is provided with a supporting system for supporting a shaft. The supporting system includes at least one outer bearing and at least one inner bearing. The outer bearing is fitted in the housing so as to form a small clearance between its outer circumferential surface and the housing. The inner bearing is fitted in the outer bearing so as to form a small clearance between its outer circumferential surface and the inner circumferential surface of the outer bearing. In the inner bearing, the shaft is inserted so as to form a small clearance between its outer circumferential surface and the inner circumferential surface of the inner bearing. At least one outer oil supply hole and at least one inner oil supply hole are formed in the outer and inner bearings, respectively and oil is supplied from the oil supply passage to each small clearance through the oil supply holes. Thereby, an oil film is formed in each small clearance, respectively and therefore a triple oil film is formed between the shaft and the housing. Accordingly, the radial vibration of the shaft are sufficiently damped by a squeeze film effect of the triple oil film and the amount of the radial vibration which is transmitted to the housing is decreased. Thereby, the noise of the centrifugal supercharger is decreased.

4 Claims, 8 Drawing Sheets

CENTRIFUGAL SUPERCHARGER HAVING SUPPORT BEARING ASSEMBLY WITH OUTER DAMPED BEARING AND INNER FLOATING BEARING

BACKGROUND OF THE INVENTION

1. Field of the Invention

The present invention relates to a centrifugal supercharger, and more particularly to a bearing mechanism for a centrifugal supercharger.

2. Description of the Prior Art

A conventional bearing mechanism for a centrifugal supercharger is disclosed, for example, in Japanese patent application laid-open publication No.56(1981)-138423. As shown in FIG. 13, this conventional mechanism includes two radial bearings 92 which rotatably support a shaft 93 on a bearing housing 91 of a centrifugal supercharger and an intermediate sleeve 94 which is disposed between the radial bearings 92. In the bearing housing 91, an oil supply hole 95 is formed and oil is supplied from a oil supply source (not shown) to the radial bearings 92 through the oil supply passage 95.

Accordingly, since the oil is supplied to clearances which are formed between the radial bearings 92 and the shaft 93 rotating with high speed and an oil film is formed in the clearances, respectively, the shaft 93 rotates while floating on the radial bearings 92. In this situation, the radial bearings 92 are dragged by the rotation of the shaft 93 through the oil films and therefore are rotated with a rotational speed of 20-30% of the rotational speed of the shaft 93. An oil film is formed in a clearance between the bearing housing 91 and each of the radial bearings 92, too.

Thereby, since the relative velocity of the sliding surfaces of the radial bearings 92 and a sliding surface of the shaft 93 is decreased and furthermore a radial vibration of the shaft 93 is inhibited by a damping effect of the oil film, the radial bearings 92 carries the rotation of the shaft 93 stably without binding due to a frictional heat under the condition which the shaft 93 is rotated with high speed.

As mentioned above, in the above conventional bearing mechanism, the oil film which is formed on the inner and outer circumferential surfaces of the radial bearings 92, respectively functions as a damper for damping the vibration of the shaft 93. In practice, however, it is not possible to sufficiently obtain the effect for damping the vibration of the shaft 93 by these oil films. Therefore, the rotational vibration of the shaft 93 is transmitted to the bearing housing 91 through the radial bearings 93 or the rotational vibration of the radial bearing 92 is transmitted to the bearing housing 91. As a result, a noise is generated and this noise becomes a problem in a centrifugal supercharger for a passenger car when silence is desired.

SUMMARY OF THE INVENTION

It is, therefore, an object of the present invention to provide an improved centrifugal supercharger which overcomes the above drawbacks.

It is another object of the present invention to provide an improved centrifugal supercharger which can decrease the noise.

In order to achieve these objects, there is provided a centrifugal supercharger which includes a housing, a shaft rotatably supported by the housing through a supporting means, a thrust bush means disposed on the shaft and forming a receiving portion, a thrust bearing fixed to the housing and disposed in the receiving portion, an oil supply passage formed in the housing and supplying oil to the supporting means and the thrust bearing, a turbine rotor and a compressor rotor fixed to one and the other ends of the shaft, respectively and the supporting means comprising at least one outer bearing which is fitted its outer circumferential surface to the housing through an oil film and which is prevented from rotating relatively with respect to the housing by a rotation preventing member and in which at least one outer oil supply hole is formed so as to penetrate in the radial direction and at least one inner bearing which is fitted its outer and inner circumferential surfaces to an inner circumferential surface and the shaft through an oil film, respectively and in which at least one inner oil supply hole is formed so as to penetrate in the radial direction.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

Figure 1:
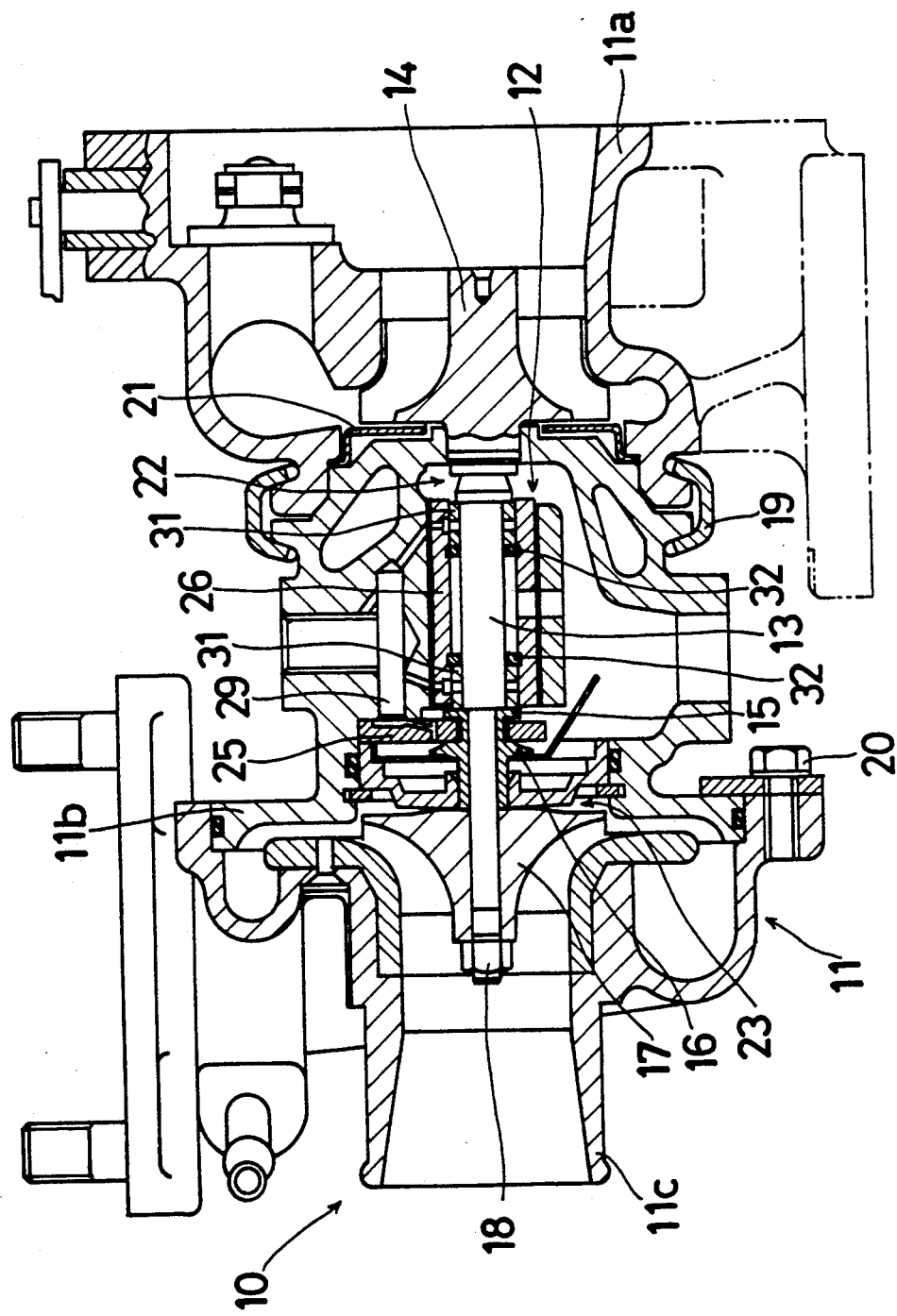
FIG. 1 is a sectional view of a first embodiment of a centrifugal supercharger in accordance with the present invention.

A centrifugal supercharger constituted in accordance with embodiments of the present invention will be described with reference to the attached drawings.

FIG. 1 to FIG. 4 show a first embodiment of the present invention. Referring to FIG. 1 to FIG. 4, a centrifugal supercharger 10 includes a housing 11 which is comprised of a turbine housing 11a, a bearing housing 11b and a compressor housing 11c. On the bearing housing 11b, a shaft 13 is rotatably supported thereon through a supporting means 12. At one end of the shaft 13, a turbine rotor 14 is fixed thereto by welding and so on and is disposed in the turbine housing 11a. On the other hand, at the other end of the shaft 13, a compressor rotor 17 is fixed thereto by a nut 18 so as to nip thrust bushes 15, 16 between its back portion and a stepped portion of the shaft 13. Now, the thrust bushes 15, 16 correspond to the thrust bush means of the present invention. The turbine housing 11a and the bearing housing 11b are fixed each other by a coupling 19 and the bearing housing 11b and the compressor housing 11c are fixed each other by a bolt 20.

A heat insulator 21 is disposed between the back portion of the turbine rotor 14 and the bearing housing 11b and an oil leak preventing mechanism 22 is constituted near the fixing portion between the shaft 13 and the turbine rotor 14. In the same way, an oil leak preventing mechanism 22 is constituted at the back portion of the compressor rotor 17.

Figure 2:
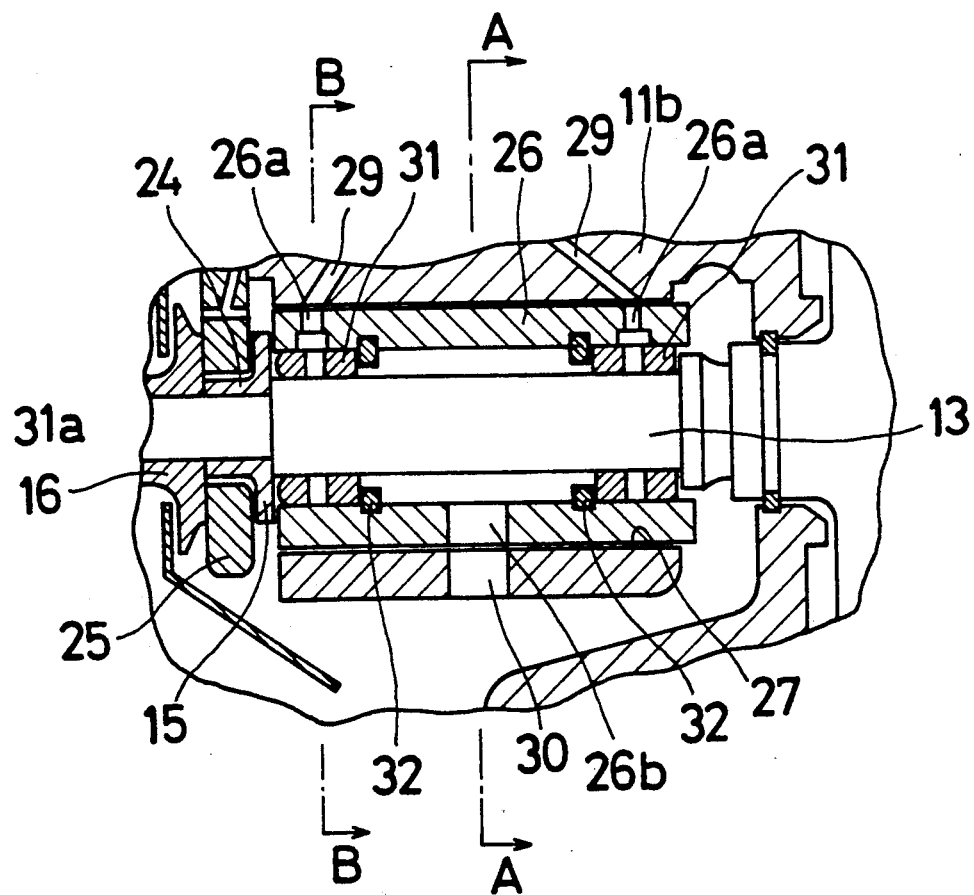
FIG. 2 is an enlarged sectional view of a portion of a first embodiment of a centrifugal supercharger in accordance with the present invention.

Referring to FIG. 2, a receiving portion 24 such as a circular groove is formed between the thrust bushes 15, 16. In the receiving portion 24, an inner circumferential portion of a thrust bearing 25 which its one part is fixed to the bearing housing 11b is fitted therein with a small clearance in the axial direction. Now, oil is supplied to the thrust bearing 25 through an oil supply passage 29 which is formed in the bearing housing 11b.

Figure 3:
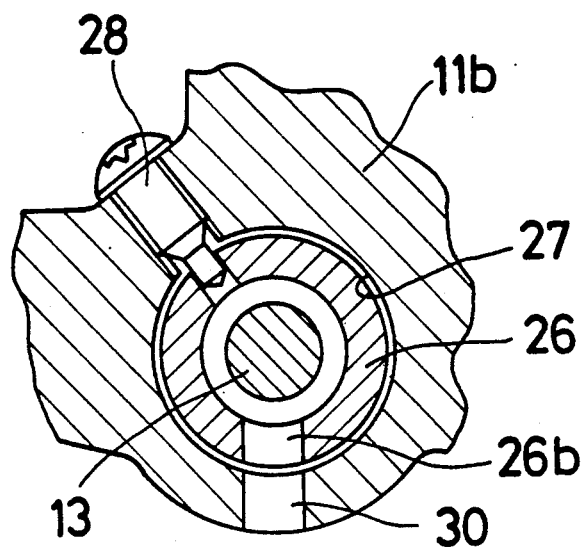
FIG. 3 is a sectional view taken substantially along the line A—A of FIG. 2 and the line D—D of FIG. 9.
Figure 4:
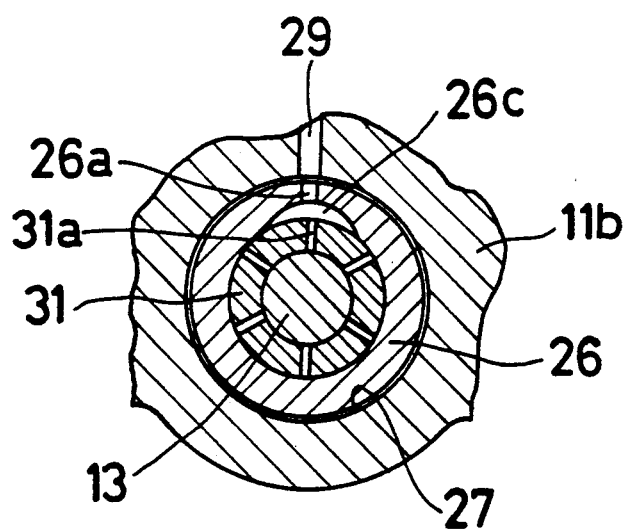
FIG. 4 is a sectional view taken substantially along the line B—B of FIG. 2 and the line E—E of FIG. 9.

The supporting means 12 is constituted by a cylindrical outer bearing 26 and a pair of cylindrical inner bearings 31. The outer bearing 26 is fitted in an inner bore 27 formed in the bearing housing 11b so as to form a small clearance between its outer circumferential surface and an inner wall surface of the inner bore 27. As shown in FIG. 3, the outer bearing 26 is provided with a radial hole at its center portion and one end of a rotation preventing member 28 which is fixed to the bearing housing 11b is inserted into the hole. Thereby, the rotation preventing member 28 prevents the outer bearing 26 from being relatively rotated with respect to the bearing housing 11b and axially moved. Now, it is possible to dispose the rotation preventing member 28 at a optional position in the axial direction of the outer bearing 26. At a upper side of both end portions of the outer bearing 26 in FIG. 2, an outer oil supply hole 26a is formed so as to penetrate in the radial direction, respectively. One end of the outer oil supply hole 26a is communicated with the oil supply passage 29, respectively and the other end of the outer oil supply hole 26a is opened into a crescent groove 26c which is formed on an inner surface of the outer bearing 26, respectively. As shown in FIG. 4, the crescent groove 26c is extended in the circumferential direction, respectively. On the other hand, a drain hole 26b is formed at a lower side of the center portion of the outer bearing 26 so as to penetrate in the radial direction. The drain hole 26b is communicated with a drain hole 30 which is formed in the bearing housing 11b.

In a bore of the outer bearing 26, a pair of inner bearings 30 are fitted therein so as to form a small clearance between its outer circumferential surface and the inner circumferential surface of the outer bearing 26. As shown in FIG. 4, plural inner oil supply holes 31a are formed in the inner bearings 31 so as to penetrate in the radial direction, respectively. Now, the inner oil supply holes 31a are all in one plane, respectively and this plane is positioned within the limits of the axial length of the crescent groove 26c, respectively. In the bores of the inner bearings 31, the shaft 13 is fitted therein so as to form a small clearance between its outer circumferential surface of the inner circumferential surfaces of the inner bearings 31. Now, the axial movement of one inner bearing 31 is prevented by a stepped portion of the shaft 13 and a snap ring 32 and the axial movement of the other inner bearing 31 is prevented by a thrust bush 15 and a snap ring 32.

The above-described first embodiment of the centrifugal supercharger operates as follows. When the exhaust gas of an engine (not shown) is discharged into the inside of the turbine housing 11a which is connected with an exhaust pipe (not shown) of the engine, the turbine rotor 14 is rotated by energy of the exhaust gas and thereby the compressor rotor 17 is driven through the shaft 13. Then, air in the compressor housing 11c is compressed by the compressor rotor 17 and is supplied to the engine. Thereby, the engine is supercharged.

Following the running of the engine, the oil is always supplied from a oil supply source (not shown) to the vicinities of the thrust bearing 25 and the supporting means 12 through the oil supply passage 29 and thereby an oil film is formed and maintained in each of the clearances.

In the vicinity of the thrust bearing 25, an oil film is formed and maintained between the left side surface of the thrust bush 15 and the right side surface of the thrust bearing 25 in FIG. 2. Similarly, an oil film is formed and maintained between the right side surface of the thrust bush 16 and the left side surface of the thrust bearing 25 in FIG. 2. Accordingly, even though the shaft 13 vibrates in the axial direction when the shaft 13 is rotated with high speed, this axial vibration of the shaft 13 is damped by squeeze film effect of the above oil films (the damping effect due to the oil) and the amount of the vibration which is transmitted to the bearing housing 11b is kept to a very low level.

On the other hand, in the vicinity of the supporting means 12, a third oil film is formed in the clearance between the bearing housing 11b and the outer bearing 26 and a second oil film is formed in the clearance between the outer bearing 26 and the inner bearing 31, respectively. Furthermore, a first oil film is formed in the clearance between the inner bearing 31 and the shaft 13, respectively. Accordingly, the radial vibration of the shaft 13 which is generated when rotating at high speed is damped to some extent by the squeeze film effect of the first oil films. Furthermore, the radial vibration of the shaft 13 which is transmitted to the inner bearings 31 and the radial vibration of the inner bearings 31 which are dragged by the rotation of the shaft 73 and which are rotated are damped by the squeeze film effect of the second oil film and are simultaneously damped by the squeeze film effect of the third oil film. Thereby, the radial vibration of the shaft 13 is sufficiently damped by a triple oil film and the amount of the vibration which is transmitted to the bearing housing 11b is kept to a very low level. Now, since the relative rotation of the outer bearing 26 with respect to the bearing housing 11b is prevented, the outer bearing 26 does not function as a vibration source.

Figure 5:
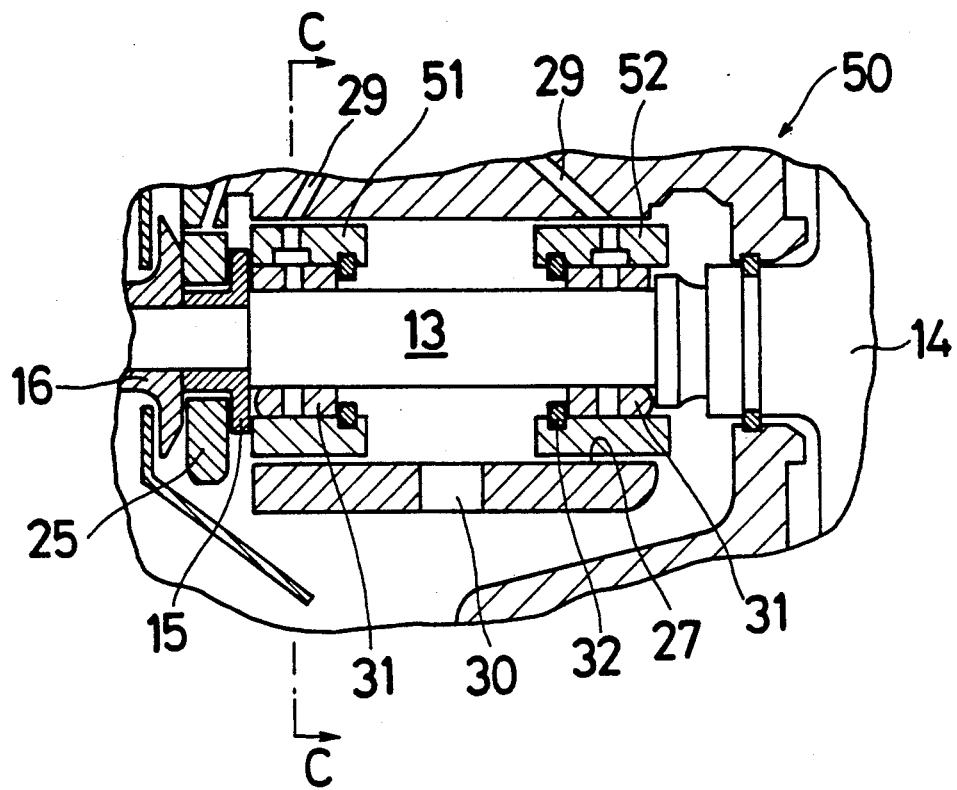
FIG. 5 is an enlarged sectional view of a portion of a second embodiment of a centrifugal supercharger in accordance with the present invention.
Figure 6:
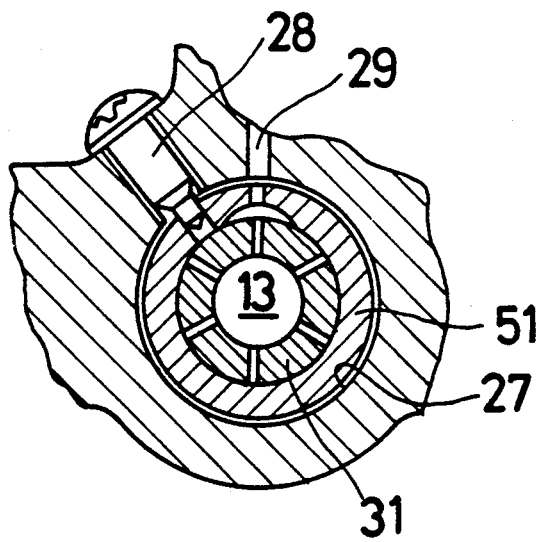
FIG. 6 is a sectional view taken substantially along the line C—C of FIG. 5.

FIG. 5 and FIG. 6 show a second embodiment of the present invention. In the FIG. 5 and FIG. 6, the same parts as found in FIG. 1 to FIG. 4 are given the same numeral utilized the FIG. 1 to FIG. 4. Referring to FIG. 5 and FIG. 6, in this embodiment, a centrifugal supercharger 50 is provided with a supporting means having a pair of outer bearings 51, 52 which are fitted in the inner bore 27 of the bearing housing 11b so as to form a small clearance between its outer circumferential surface and the inner wall surface of the inner bore 27, respectively and the inner bearings 31. As shown in FIG. 6, each of the outer bearings 26 is provided with a radial hole in which one end of the rotation preventing member 28 is inserted, so that the relative rotation and the axial movement of the outer bearing 26 with respect to the bearing housing 11b are prevented. Now, since the other structures and the operation are the same as in the first embodiment shown by FIG. 1 to FIG. 4, their description is omitted.

Figure 7:
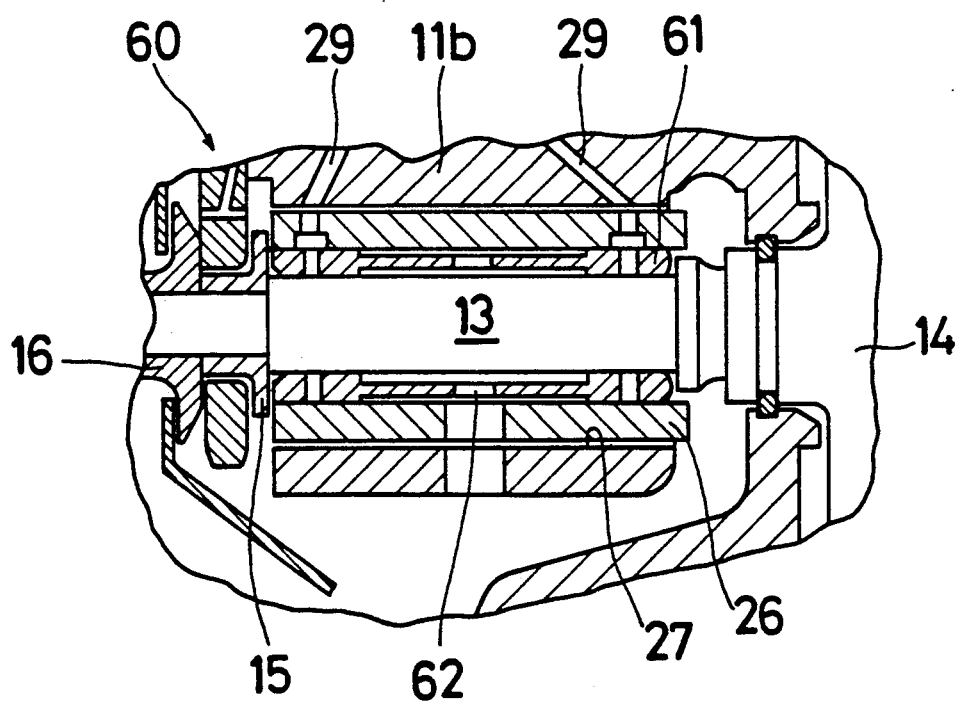
FIG. 7 is an enlarged sectional view of a portion of a third embodiment of a centrifugal supercharger in accordance with the present invention.

FIG. 7 shows a third embodiment of the present invention. In the FIG. 7, the same parts as found in FIG. 1 to FIG. 4 are given the same numeral utilized in FIG. 1 to FIG. 4. Referring to FIG. 7, in this embodiment, a centrifugal supercharger 60 is provided with a supporting means having the cylindrical outer bearing 26 and a single cylindrical inner bearing 61 which is fitted in the bore of the outer bearing 26 so as to form a small clearance between both end portions of its outer circumferential surface and the inner circumferential surface of the outer bearing 26. In this embodiment, since the axial movement of the inner bearing 61 is prevented by the stepped portion of the shaft 13 and the thrust bush 15, it is possible to abolish the snap ring utilized in the first embodiment. Now, since the other structures and the operation are the same as in the first embodiment shown by FIG. 1 to FIG. 4, further description is omitted.

Figure 8:
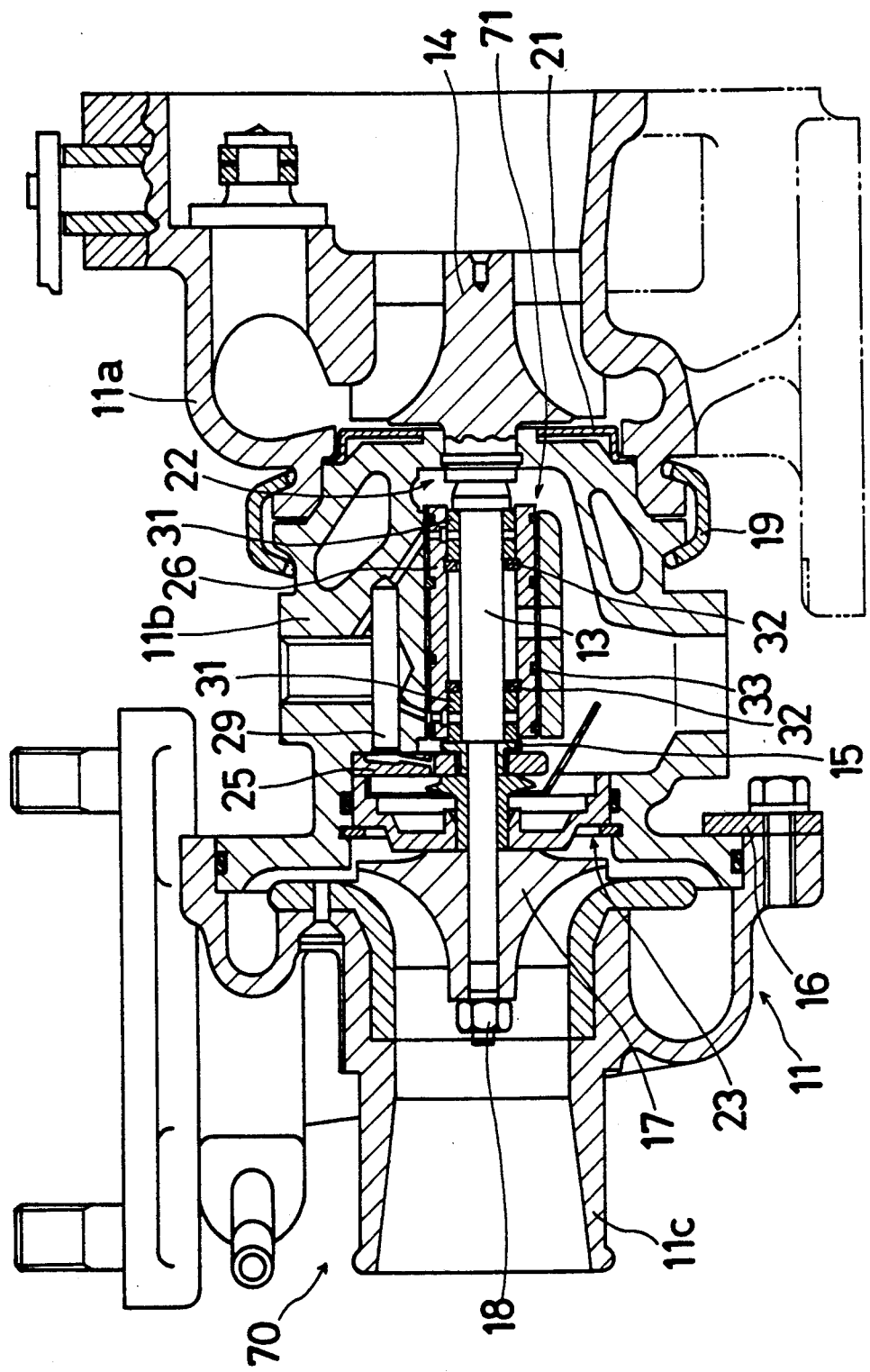
FIG. 8 is a sectional view of a fourth embodiment of a centrifugal supercharger in accordance with the present invention.
Figure 9:
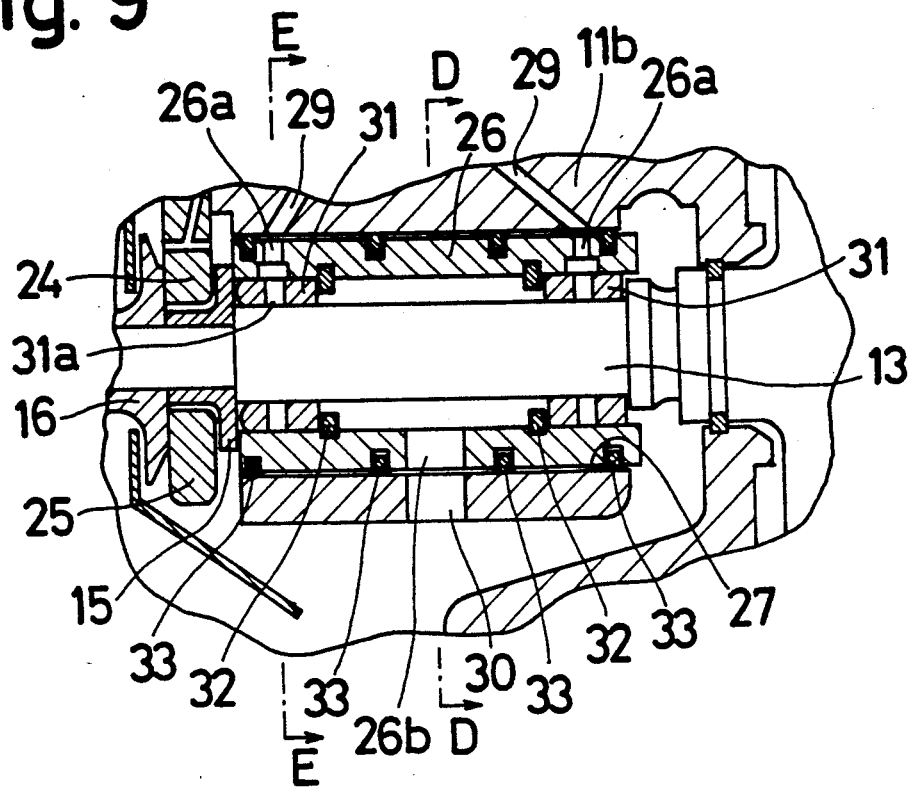
FIG. 9 is an enlarged sectional view of a portion of a fourth embodiment of a centrifugal supercharger in accordance with the present invention.

FIG. 8 and FIG. 9 show a fourth embodiment of the present invention. In FIG. 8 and FIG. 9, the same parts as found in FIG. 1 to FIG. 4 are given the same numerals utilized in FIG. 1 to FIG. 4. Referring to FIG. 8 and FIG. 9, in this embodiment, a centrifugal supercharger 70 is provided with a supporting means 71 having the cylindrical outer bearing 26, a pair of cylindrical inner bearings 31 and four O-rings 33 which are disposed between the inner wall of the inner bore 27 of the bearing housing 11b and the outer circumferential surface of the outer bearing 26. The O-rings 33 which correspond to a sealing means of the present invention are made of a elastic material such as rubber or resin and so on and are liquid-tightly fitted into circular grooves which are formed on the outer bearing 26, respectively. Furthermore, the O-rings 33 are liquid-tightly contacted with the inner wall surface of the inner bore 27 of the bearing housing 11b and thereby two circular sealing spaces which communicate with only the oil supply passage 29 and the outer oil supply holes 26a are formed between the outer circumferential surface of the outer bearing 26 and the inner wall surface of the inner bore 27 of the bearing housing 11b. The number of the O-rings 33 should not be confined to four, but it is necessary to use plural O-rings 33. In case of two O-rings 33, the O-rings 33 should be fitted on both end portions of the outer bearing 26, so that the oil supply holes 26a are positioned between the O-rings 33. Now, the outer bearing 26 is positioned on a concentric circle of the inner bore 27 of the bearing housing 11b by the O-rings 33.

According to this embodiment, it is possible to surely maintain the third oil film which is formed in the clearance between the outer bearing 26 and the bearing housing 11b by the O-rings 33. Thereby, the radial vibration of the shaft 13 is sufficiently surely damped by a triple oil film and the amount of the vibration which is transmitted to the bearing housing 11b is surely kept to a very low level. Furthermore, it is possible to decrease the leaking of the oil towards the oil leak preventing mechanism 22. Now, since the other structures are the same as in the first embodiment shown by FIG. 1 to FIG. 4, further description is omitted.

Figure 10:
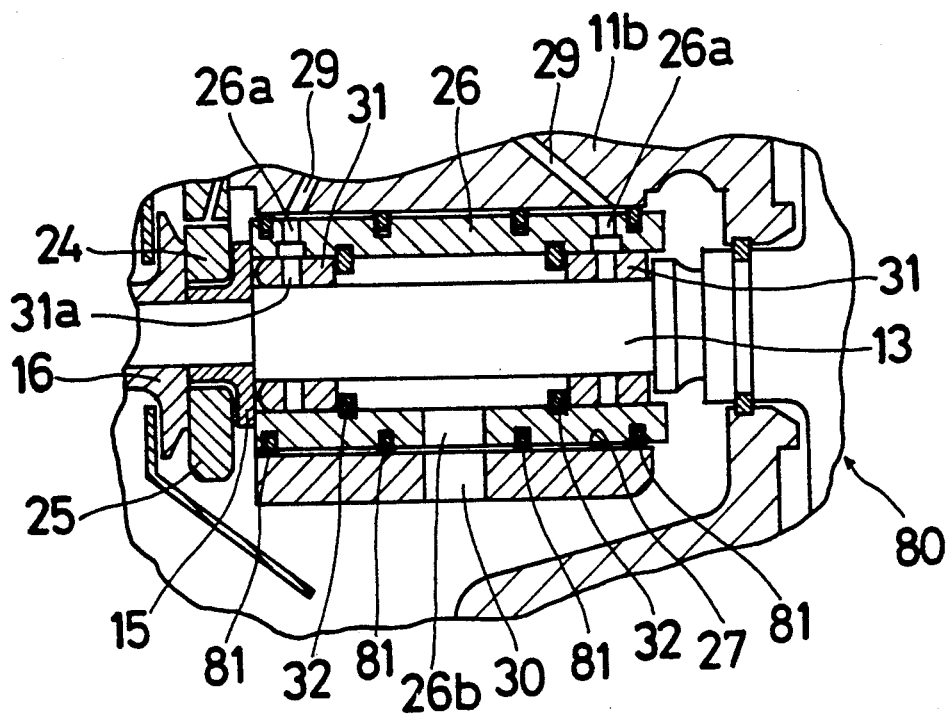
FIG. 10 is an enlarged sectional view of a portion of a fifth embodiment of a centrifugal supercharger in accordance with the present invention.
Figure 11:
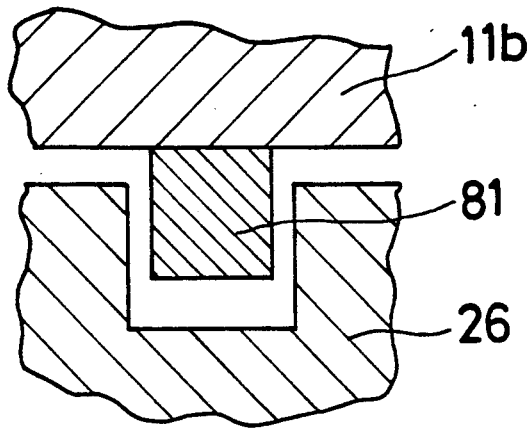
FIG. 11 is a partly enlarged sectional view of a seal means of a fifth embodiment of a centrifugal supercharger in accordance with the present invention.
Figure 12:
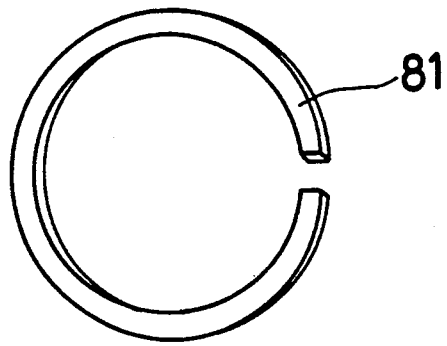
FIG. 12 is a perspective view of a seal means of a fifth embodiment of a centrifugal supercharger in accordance with the present invention.
Figure 13:
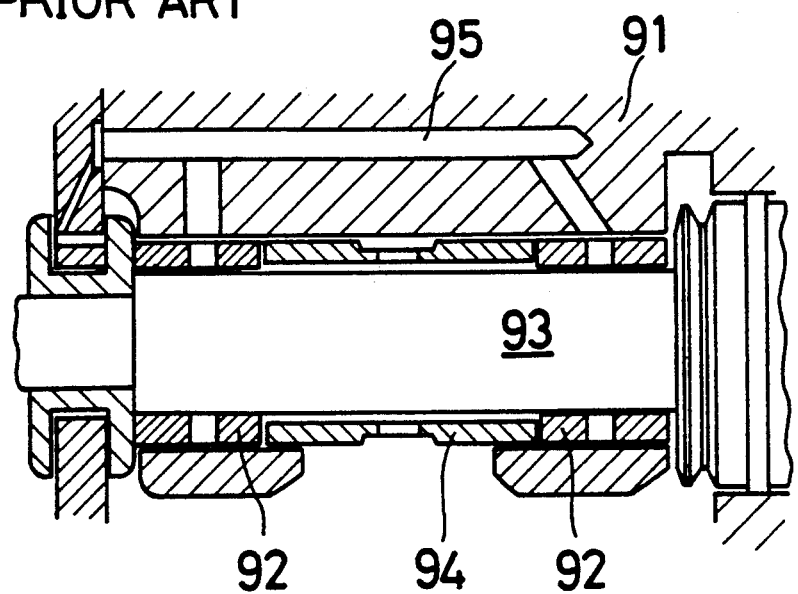
FIG. 13 is a sectional view of a bearing mechanism of a prior centrifugal supercharger.

FIG. 10 to FIG. 12 show a fifth embodiment of the present invention. In FIG. 10 to FIG. 12, the same parts as found in FIG. 1 to FIG. 4 are given the same numerals utilized the FIG. 1 to FIG. 4. Referring to FIG. 10 to FIG. 12, in this embodiment, a centrifugal supercharger 80 is provided with a supporting means having the cylindrical outer bearing 26, a pair of cylindrical inner bearings 31 and four metallic rings 81 which are disposed between the inner wall of the inner bore 27 of the bearing housing 11b and the outer circumferential surface of the outer bearing 26. The metallic rings 81 which correspond to a sealing means of the present invention are fitted into circular grooves which are formed on the outer bearing 26, respectively. It is desirable to make the metallic ring 81 by metal which is excellent in heat-resisting property, so that it is not necessary to cool the bearing housing 11b by water-cooling. As shown in FIG. 12, the metallic ring 81 is provided with cut ends and thereby has a elasticity in the radial direction. Thereby, as shown in FIG. 11, when the outer bearing 26 having the metallic rings 81 are fitted thereon is fitted in the inner bore of the bearing housing 11b, the outer circumferential surface of the metallic ring 81 is liquid-tightly pressed to the inner wall of the inner bore 27 of the bearing housing 11b by its elastic force. In this situation, both cut ends of the metallic ring 81 are closed and furthermore both surfaces of the metallic ring 81 are separated from the surfaces of the circular groove in the axial direction as shown in FIG. 11. When the engine (not shown) is started, however, the metallic ring 81 is axially moved by the oil pressure which is supplied thereto, so that one surface of the metallic ring 81 is liquid-tightly pressed to one surface of circular groove of the outer bearing 26. Thereby, two circular sealing spaced which communicate with only the oil supply passage 29 and the oil supply holes 26a are formed between the outer circumferential surface of the outer bearing 26 and the inner wall surface of the inner bore 27 of the bearing housing 11b. Now, in this embodiment, it is possible to select the number of the metallic rings 81 as same as the above-described fourth embodiment. Now, since the other structures are the same as in the first embodiment shown by FIG. 1 to FIG. 4 and the fourth embodiment shown by FIG. 8 and FIG. 9, further description omitted.

Now, in the fourth and fifth embodiments, the supporting means is provided with a pair of inner bearings 31. However, it is possible to use a single inner bearing as shown in FIG. 7. Furthermore, it is possible to use plural outer bearings as shown in FIG. 5.

According to the present invention, as mentioned above, the thrust bearing is disposed in the receiving portion which is formed by the thrust bush means and the oil is supplied to the clearance between the thrust bearing and the thrust bush means. Thereby, the oil film is formed in the clearance and the axial vibration of the shaft is damped by this oil film. Furthermore, the shaft is supported by the outer bearing and the inner bearing which are doubled in the radial direction. Thereby, a triple oil film is formed between the housing and the outer bearing, between the outer bearing and the inner bearing and between the inner bearing and the shaft and the radial vibration of the shaft is damped by this triple oil film. Accordingly, since the axial and the radial vibrations of the shaft are sufficiently damped and therefore the amount of the vibrations which are transmitted to the housing kept to a very low level, it is possible to decrease the noise of the centrifugal supercharger.

Furthermore, in case of the centrifugal supercharger having a sealing means which is disposed between the housing and the outer bearing, since the oil film which is formed between the housing and the outer bearing is surely maintained by the sealing means, the radial vibration of the shaft is sufficiently surely damped and therefore the amount of the vibration which is transmitted to the housing is surely kept to a very low level. Furthermore, it is possible to prevent the oil leaking.

The principles, preferred embodiments, and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

I claim:
1. A centrifugal supercharger comprising;
a housing,
a shaft rotatably supported by the housing via a supporting means,
a thrust bush means disposed on the shaft and forming a receiving portion,
a thrust bearing fixed to the housing and disposed in the receiving portion,
an oil supply passage formed in the housing and supplying oil to the supporting means and the thrust bearing,
a turbine rotor and a compressor rotor fixed to one and the other ends of the shaft, respectively, and
the supporting means comprising at least one outer bearing having an outer circumferential surface fitted in the housing via an oil film and which is prevented from rotating relatively with respect to the housing by a rotation preventing member, and in which at least one outer oil supply hole is formed so as to penetrate in the radial direction, and at least one inner bearing having outer and inner circumferential surfaces is fitted on an outer circumferential surface of the shaft via an oil film, respectively and in which at least one inner oil supply hole is formed so as to penetrate in the radial direction.

2. A centrifugal supercharger as recited in claim 1, wherein the supporting means is further provided with a sealing means which is disposed between the housing and the outer bearing so as to maintain the oil film formed between the outer circumferential surface of the outer bearing and the housing.

3. A centrifugal supercharger as recited in claim 2, wherein the sealing means is comprised of plural elastic rings which are disposed between the outer bearing and the housing so as to be liquid-tightly pressed to the outer circumferential surface of the outer bearing and the housing, respectively.

4. A centrifugal supercharger as recited in claim 2, wherein the sealing means is comprised of plural metallic rings which are disposed between the outer bearing and the housing so as to be liquid-tightly pressed to the outer surface of the outer bearing and the housing, respectively.

* * * * *